(12) United States Patent
Hatakeyama et al.

(10) Patent No.: US 10,315,803 B2
(45) Date of Patent: Jun. 11, 2019

(54) DOUBLE CONTAINER ASSEMBLY AND MANUFACTURING METHOD THEREFOR

(71) Applicant: Heiwa Kagaku Industry Co., Ltd., Ichikawa-shi, Chiba (JP)

(72) Inventors: Kazuyuki Hatakeyama, Ichikawa (JP); Harumasa Hatakeyama, Ichikawa (JP)

(73) Assignee: HEIWA KAGAKU INDUSTRY CO., LTD., Ichikawa-shi (JP)

( * ) Notice: Subject to any disclaimer, the term of this patent is extended or adjusted under 35 U.S.C. 154(b) by 0 days.

(21) Appl. No.: 15/529,639

(22) PCT Filed: Oct. 26, 2016

(86) PCT No.: PCT/JP2016/081711
§ 371 (c)(1),
(2) Date: May 25, 2017

(87) PCT Pub. No.: WO2017/073606
PCT Pub. Date: May 4, 2017

(65) Prior Publication Data
US 2017/0283115 A1 Oct. 5, 2017

(30) Foreign Application Priority Data

Oct. 26, 2015 (JP) ................................ 2015-209952

(51) Int. Cl.
*B65D 23/02* (2006.01)
*B29C 49/04* (2006.01)
(Continued)

(52) U.S. Cl.
CPC .............. *B65D 23/02* (2013.01); *B29C 49/04* (2013.01); *B29C 49/22* (2013.01); *B29C 49/48* (2013.01);
(Continued)

(58) Field of Classification Search
CPC ........ B65D 23/02; B65D 41/04; B65D 1/023; B65D 1/02; B29C 49/4802; B29C 49/04;
(Continued)

(56) References Cited

U.S. PATENT DOCUMENTS 3,892,828 A 7/1975 Weatherly et al.
4,887,744 A * 12/1989 Williams ............ B05B 11/3023
222/402.1
(Continued)

FOREIGN PATENT DOCUMENTS

JP 45-12357 B1 5/1970
JP 54-18704 B2 7/1979
(Continued)

OTHER PUBLICATIONS

Extended (Supplementary) European Search Report dated May 17, 2018, issued in counterpart application No. 16859836.5. (13 pages).
(Continued)

*Primary Examiner* — Kareen K Thomas
(74) *Attorney, Agent, or Firm* — Westerman, Hattori, Daniels & Adrian, LLP

(57) ABSTRACT

Provided is a manufacturing method for a double container that allows easy manufacturing with a molding device not significantly different from conventional devices and that can, at a lower cost than the processing cost of conventional technology, very easily and reliably form, in a comparatively rigid outer container and in a double container that allows, inside the outer container, capacity to be varied with respect to the amount of content, an opening for allowing external air to enter. When a pair of partial molds are brought near each other in order to form a split mold, at least part of the mating faces of the pair of partial molds forms a projection by sandwiching a small outer diameter portion of a parison, a gap that passes between the double container is created by cutting off the projection, and the gap is opened and expanded by screwing on a cap.

7 Claims, 15 Drawing Sheets

(51) Int. Cl.
    *B29C 49/22*     (2006.01)
    *B29C 49/48*     (2006.01)
    *B29C 49/72*     (2006.01)
    *B65D 1/02*     (2006.01)
    *B65D 41/04*     (2006.01)
    *B65D 1/00*     (2006.01)
    *B29K 23/00*     (2006.01)
    *B29L 31/00*     (2006.01)

(52) U.S. Cl.
    CPC .......... *B29C 49/4802* (2013.01); *B29C 49/72* (2013.01); *B65D 1/02* (2013.01); *B65D 1/023* (2013.01); *B65D 41/04* (2013.01); *B29C 2049/4805* (2013.01); *B29K 2023/0633* (2013.01); *B29K 2023/086* (2013.01); *B29K 2023/12* (2013.01); *B29K 2905/02* (2013.01); *B29K 2905/12* (2013.01); *B29L 2031/712* (2013.01); *B65D 1/00* (2013.01)

(58) Field of Classification Search
    CPC ......... B29C 49/22; B29C 49/72; B29C 49/48; B29C 2023/0633; B29C 2023/086; B29C 2023/12; B29C 2905/02; B29C 2905/12; B29K 2023/0633; B29K 2023/086; B29K 2023/12; B29K 2905/02; B29K 2905/12
    USPC ......... 264/36.15, 524, 527, 268, 918, 288.4, 264/288.8; 493/52
    See application file for complete search history.

(56) References Cited

U.S. PATENT DOCUMENTS

| | | | |
|---|---|---|---|
| 5,405,057 A * | 4/1995 | Moore | B05B 11/3023 |
| | | | 222/153.13 |
| 6,422,425 B1 * | 7/2002 | Tada | B05B 11/3059 |
| | | | 222/153.07 |
| 2001/0032853 A1 | 10/2001 | Kuehn et al. | |
| 2004/0069735 A1 | 4/2004 | Yoneyama et al. | |
| 2009/0159482 A1 * | 6/2009 | Begley | B29C 49/06 |
| | | | 206/528 |

FOREIGN PATENT DOCUMENTS

| | | |
|---|---|---|
| JP | 3368484 B2 | 1/2003 |
| JP | 2003-534148 A | 11/2003 |
| JP | 3627946 B2 | 3/2005 |
| JP | 2006-335398 A | 12/2006 |
| JP | 4803590 B2 | 10/2011 |
| JP | 4936249 B2 | 5/2012 |
| JP | 2014-46956 A | 3/2014 |
| JP | 2014-91531 A | 5/2014 |

OTHER PUBLICATIONS

International Search Report dated Dec. 6, 2016, issued in counterpart application No. PCT/JP2016/081711. (2 pages).
Written Opinion dated Dec. 6, 2016, issued in counterpart International Application No. PCT/JP2016/081711 (3 pages).

* cited by examiner

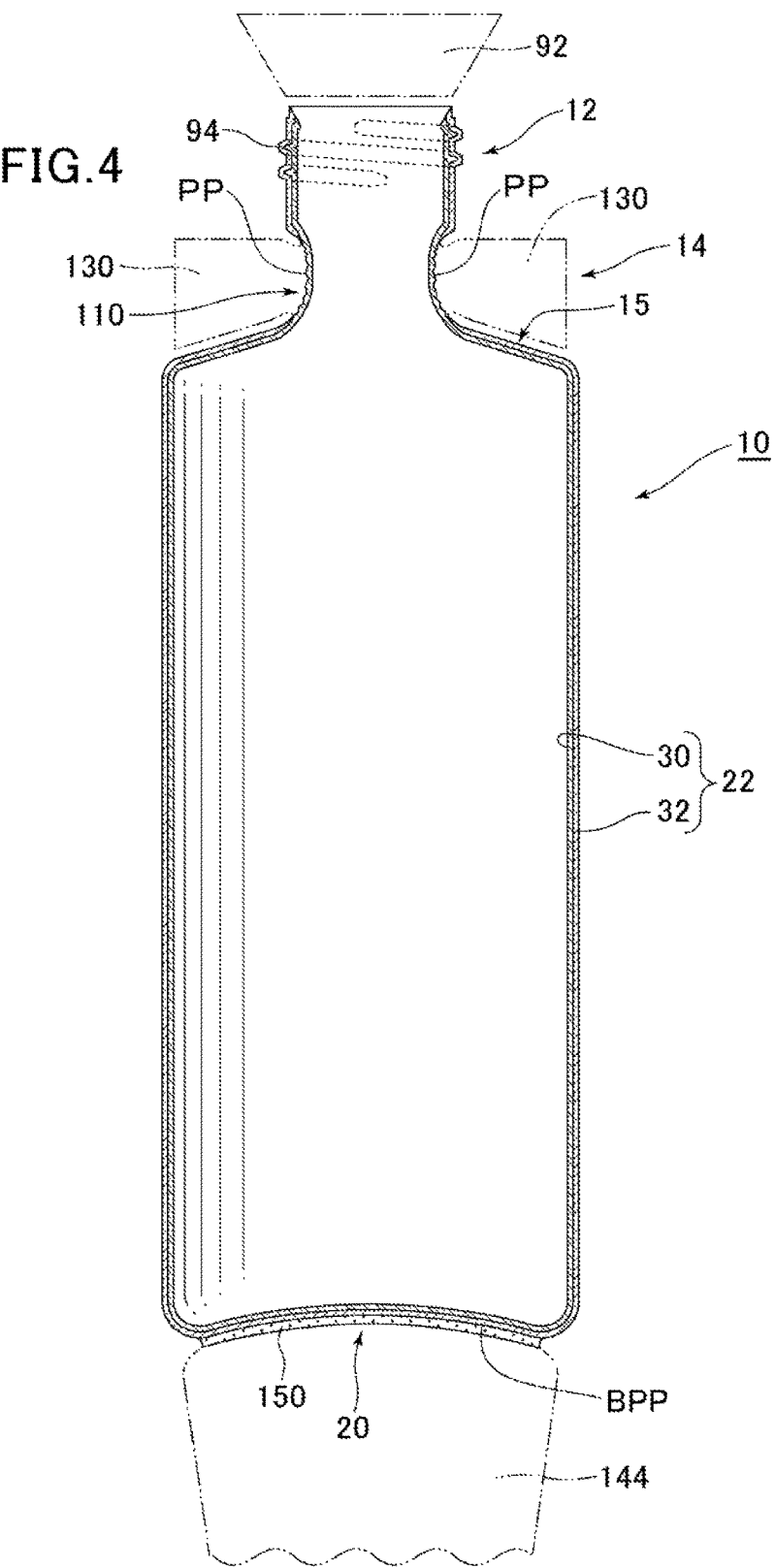

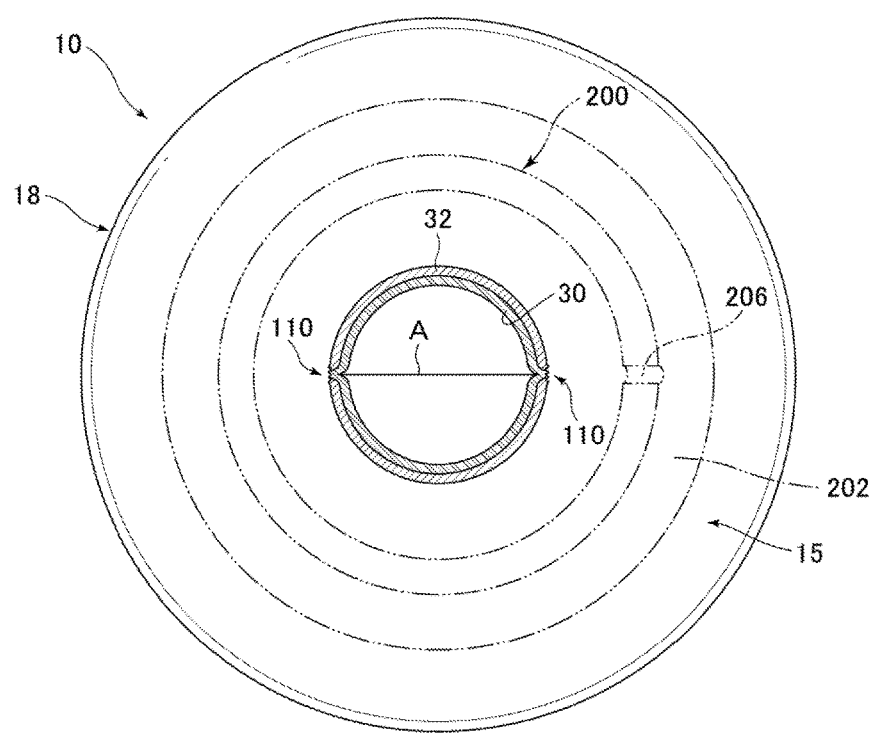

DOUBLE CONTAINER ASSEMBLY AND MANUFACTURING METHOD THEREFOR

TECHNICAL FIELD

The present invention relates to a double container assembly and a manufacturing method therefor. More specifically, the present invention relates to a double container assembly comprising: a double container comprised of a relatively-rigid outer container and a flexible inner container disposed inside the outer container and capacity-variable in response to an amount of a content thereof and capable of being easily produced using a molding apparatus which is not largely different from a conventional type; and a threaded cap, and to a manufacturing method for the double container assembly.

BACKGROUND ART

It is desirable that a container be capable of even when an amount of a content thereof is reduced by using or consuming a part of the content, keeping the remaining content from contacting with external air and thereby preventing oxidation of the remaining content.

Specifically, in a commonly-used liquid container, it is easy to prevent oxidation of a content thereof during a period after hermetically closing the container through until the container is opened. For example, it can be achieved by, after filling the container with the content and before hermetically closing the container, vacuumizing an internal space of the container, or filling the internal space with inert gas such as nitrogen gas. However, as for a conventional rigid container, in a situation where the container is opened to consume a part of the content, so that an unused part of the content remains in the container, external air enters the container in a volume corresponding to an amount of consumption of the content, causing oxidation of the remaining content. In order to prevent such oxidation, an antioxidant is contained in the content, in some cases.

With a view to preventing oxidation of such a remaining content, there has been proposed a container comprising a rigid outer container (rigid outer container layer) and a flexible inner container (flexible inner container layer), wherein the container is configured to, when a content of the container is consumed, reduce a capacity (volume) of the flexible inner container by an amount corresponding to an amount of consumption of the content to thereby prevent external air from entering the flexible inner container, without causing deformation of the rigid outer container, i.e., while maintaining independence of the rigid outer container. This type of container has been commercialized as a seasoning container or the like.

A problem to be solved in the above conventional double container configured to reduce the capacity of the flexible inner container by an amount corresponding to an amount of consumption of a content thereof to thereby prevent external air from entering the flexible inner container, without causing deformation of the outer container is that the flexible inner container needs to be in contact with an inner surface of the outer container during manufacturing, and then to be separated from the inner surface of the outer container in response to consumption of the content to thereby allow external air to be introduced into a space between the flexible inner container and the outer container. If an opening for introducing external air into the above space can be reliably formed using a simple apparatus or without using any apparatus, and with a simplified work, the above container would become significantly useful.

As a conventional technique relating to formation of the opening for introducing external air into the space between the rigid outer container and the flexible inner container, there has been proposed a hollow, inner layer-separable laminate container formed in an at least two-layer structure comprising an outer layer and an inner layer each made of a thermoplastic resin, wherein the laminate container has: a body portion whose wall is formed as easily-separable laminated walls by a portion of the outer layer and a portion of the inner layer in contact with the portion of the outer layer; and a mouth-neck portion provided with an atmospheric air introduction hole for enabling atmospheric air to be introduced between the laminated walls therethrough, at a position below a threaded section formed on an outer peripheral surface of the mouth-neck portion so as to enable a cap member or the like to be threadingly engaged therewith, and wherein portions of the outer and inner layers defining the atmospheric air introduction hole are formed to protrude outwardly so as to enable a distal end of the atmospheric air introduction hole-defining portion of only the outer layer to be cut off in a simplified manner to thereby easily open the atmospheric air introduction hole without damaging the atmospheric air introduction hole-defining portion of the inner layer (see, for example, the following Patent Document 1).

As another conventional technique relating to formation of the external air introducing opening, there has been proposed a bottle structure comprising an outer layer made of a synthetic resin and forming an outer shell with a given shape, an inner layer made of a flexible synthetic resin and separably laminated to the outer layer to form an inner pouch, each formed by blow-molding, wherein an exposed portion of the inner layer is formed such that it is located at a top of a protruding piece protrudingly provided on a lower end of a cylindrical mouth portion provided to extend continuously and upwardly from an upper end of a body portion of the bottle structure (see, for example, the following Patent Document 2).

As yet another conventional technique relating to formation of the external air introducing opening, there has been proposed a double container having a body portion and a mouth-neck portion formed to extend upwardly from the body portion, wherein the double container is prepared by separably laminating an inner layer made of a synthetic resin and deflatable along with ejection of a liquid content, to an inner surface of an outer layer made of a synthetic resin and having a shape retaining property and wherein, in a part of a corner region where an upper edge of a peripheral wall of the body portion and an outer peripheral edge of a top wall of the body portion intersect with each other, a portion of the outer layer defining an outer surface of the part of the corner region is cut off and removed along a direction orthogonal to a protruding direction of the corner region to thereby make an air inlet hole for introducing external air into a space between the outer layer and the inner layer (see, for example, the following Patent Document 3).

As still another conventional technique relating to formation of the external air introducing opening, there has been proposed a synthetic resin blow-molded container comprising: an outer layer forming an outer shell; and an inner layer forming an inner pouch and separably laminated to the outer layer, wherein: the inner layer has a bulging portion formed in a peripheral wall of a cylindrical mouth portion of the container, and a portion of the outer layer laminated to a vicinity of a tip of the bulging portion is standingly formed as a flat tab piece having a circumferential edge around the tip to serve as a tearable base end, wherein the base end is formed in a notch-like shape; the bulging portion of the inner layer being formed by subjecting a portion of the peripheral wall of the cylindrical mouth portion to bulge forming together with the outer layer, during blow molding of the container, the tab piece being formed by subjecting the portion of the outer layer laminated to the vicinity of the tip of the bulging portion of the inner layer to pressing using mating surfaces of a split mold used in the blow molding, and the notch-like shape of the base end being formed along a shape of a mold cavity during formation of the bulging portion; whereby a portion of the outer layer can be peelingly removed from the vicinity of the tip of the bulging portion of the inner layer to provide an air inlet hole for introducing external air between the outer layer and the inner layer (see, for example, the following Patent Document 4).

CITATION LIST

Patent Document

Patent Document 1: JP 2006-335398A
Patent Document 2: JP 3368484 B
Patent Document 3: JP 3627946 B
Patent Document 4: JP 4936249 B

SUMMARY OF INVENTION

Technical Problem

In the container proposed in the Patent Document 1, the configuration "portions of the outer and inner layers defining the atmospheric air introduction hole are formed to protrude outwardly" is obtained by providing a recess in a cavity surface of a molding mold and pushing a parison composed of the laminate of the inner layer and the outer layer into the recess by a blow pressure. In this process, a push-in amount of the parison varies depending on a blow pressure, a parison temperature, an environmental temperature, a mold temperature, a blowing timing, a blowing air temperature and the like, so that a position of an outermost edge of the inner layer is not constant. Thus, a subsequent processing "to enable a distal end of the atmospheric air introduction hole-defining portion of only the outer layer to be cut off in a simplified manner to thereby easily open the atmospheric air introduction hole without damaging the atmospheric air introduction hole-defining portion of the inner layer" requires using a high-precision milling machine or the like. Therefore, this technique is unsuitable as that for a container to be mass-produced. If a part of the outer layer remains after the above processing, it hinders introduction of external air. On the other hand, if the inner layer is damaged or broken, original functions of the container will be impaired.

In the bottle structure proposed in the Patent Document 2, "a protruding piece protrudingly provided on a lower end of a cylindrical mouth portion provided to extend continuously and upwardly from an upper end of a body portion of the bottle structure" is obtained by providing a recess in a cavity surface of a molding mold and pushing a parison composed of the laminate of the inner layer and the outer layer into the recess by a blow pressure. In this process, a thickness of the protruding piece varies depending on a blow pressure, a parison temperature and the like, so that a position of an outermost edge of the inner layer is not constant. Thus, a subsequent processing for forming "an exposed portion of the inner layer" is industrially significantly difficult.

In the double container proposed in the Patent Document 3, when "in a part of a corner region where an upper edge of a peripheral wall of the body portion and an outer peripheral edge of a top wall of the body portion intersect with each other, a portion of the outer layer defining an outer surface of the part of the corner region is cut off and removed along a direction orthogonal to a protruding direction of the corner region", a thickness of the entire peripheral wall of the container including the corner region varies depending on a blow pressure, a parison temperature and the like, and, due to contraction caused by cooling after molding, etc. Thus, it is difficult to industrially implement the technique of cutting off and removing a portion of the outer layer defining the outer surface of the part of the corner region, along the direction orthogonal to the protruding direction, to expose the inner layer, as with the techniques in the Patent Documents 1 and 2.

In the container proposed in the Patent Document 4, the configuration "the inner layer has a bulging portion formed in a peripheral wall of a cylindrical mouth portion of the container, and a portion of the outer layer laminated to a vicinity of a tip of the bulging portion is standingly formed as a flat tab piece having a circumferential edge around the tip to serve as a tearable base end" is "formed by subjecting the portion of the outer layer laminated to the vicinity of the tip of the bulging portion of the inner layer to pressing using mating surfaces of a split mold used in the blow molding". As to a specific embodiment, the Patent Document 4 describes "in this process, the bulging portion 11 of the inner layer 3 can be formed by subjecting a portion of the peripheral wall of the cylindrical mouth portion 4 to bulge forming together with the outer layer 2, during blow molding of the container 1. Further, the tab piece 14 can be formed by subjecting the portion of the outer layer 2 laminated to the vicinity of the tip 12 of the inner layer 3 to pressing using mating surfaces of a split mold used in the blow molding".

In this invention, causing the portion of the outer layer 2 to bulge into a recess formed in the mating surfaces of the split mold so as to form the tab piece 14 is realized by pushing a parison into the recess under a high pressure generated inside the parison by air blowing. In this process, although a volume of the parison entering into the recess so as to form the tab piece 14 is constant, to what extent the inner layer 2 is pushed into the recess or toward a vicinity of an inlet of the recess largely varies depending on a parison temperature, a blow pressure and the like at the time. Thus, it is significantly difficult to always enable the budging portion 11 of the inner layer 3 to be exposed when the tab piece 14 is torn in a notched portion 13n thereof, as depicted in FIG. 2(b) of the Patent Document 4. That is, the invention proposed in the Patent Document 4 would be merely a conceptual idea, and it would be impossible to implement it in an industrially useful manner.

Object of Invention

The present invention has been made in view of the above problems particularly with an external air introducing opening in a double container comprised of a relatively-rigid outer container and a flexible inner container disposed inside the outer container and capacity-variable in response to an amount of a content thereof, and an object of the present invention is to provide a double container assembly comprising: a double container comprised of a relatively-rigid outer container and a flexible inner container disposed inside the outer container and capacity-variable in response to an amount of a content thereof and capable of being easily produced using a molding apparatus which is not largely different from a conventional type; and a threaded cap, and a manufacturing method for the double container assembly, wherein the double container assembly and the manufacturing method can form an external air introducing opening in the double container significantly easily and reliably at a lower processing cost than that in conventional techniques.

Solution to Technical Problem

According to a first aspect of the present invention, there is provided a method for manufacturing a double container assembly comprising a double container and a threaded cap, wherein the double container is molded, using a split mold as a combination of a pair of partial molds, from a parison comprising at least two layers of an inner layer and an outer layer forming, respectively, a rigid outer container layer and a flexible inner container layer which are separable from each other after molding, and is configured to introduce external air into a space between the rigid outer container layer and the flexible inner container layer to enable a capacity of the flexible inner container layer to be reduced, while retaining a shape of the rigid outer container layer. The method comprises: a step A of: forming a large-outer-diameter region having a given outer diameter, in a cap-receiving threaded portion or a container body portion of the double container or a portion of the double container therebetween, and a small-outer-diameter region having an outer diameter less than that of the large-outer-diameter region, in a portion of the double container between the large-outer-diameter region and the cap-receiving threaded portion; and, during a course of moving the pair of partial molds to come close to each other so as to combine them together to make up the split mold, clamping a portion of the parison corresponding to the small-outer-diameter region by at least respective parts of mating surfaces of the pair of partial molds, to thereby form a clearance-caused burr; a step B of removing the clearance-caused burr formed in the step A; and a step C of forming the threaded cap such that, when the threaded cap is threadingly engaged with the cap-receiving threaded portion, it applies a tension to the small-outer-diameter region from which the clearance-caused burr has been removed, in a direction causing the cap-receiving threaded portion and the large-outer-diameter region to be pulled away from each other.

According to a second aspect of the present invention, there is provided a double container assembly comprising a double container and a threaded cap, wherein the double container is molded, using a split mold as a combination of a pair of partial molds, from a parison comprising at least two layers of an inner layer and an outer layer forming, respectively, a rigid outer container layer and a flexible inner container layer which are separable from each other after molding, and is configured to introduce external air into a space between the rigid outer container layer and the flexible inner container layer to enable a capacity of the flexible inner container layer to be reduced, while retaining a shape of the rigid outer container layer, and wherein: the double container comprises a cap-receiving threaded portion, a container body portion, and a portion therebetween, wherein a large-outer-diameter region having a given outer diameter is formed in any one of the cap-receiving threaded portion, the container body portion and the portion therebetween, and a small-outer-diameter region having an outer diameter less than that of the large-outer-diameter region is formed between the large-outer-diameter region and the cap-receiving threaded portion, wherein the small-outer-diameter region has a site obtained by removing a clearance-caused burr formed such that, during a course of moving the pair of partial molds to come close to each other so as to combine them together to make up the split mold, a portion of the parison corresponding to the small-outer-diameter region is clamped by at least respective parts of mating surfaces of the pair of partial molds: and the threaded cap is formed such that, when the threaded cap is threadingly engaged with the cap-receiving threaded portion, it applies a tension to the small-outer-diameter region from which the clearance-caused burr has been removed, in a direction causing the cap-receiving threaded portion and the large-outer-diameter region to be pulled away from each other.

Effect of Invention

The double container assembly and the manufacturing method of the present invention can obtain an advantageous effect of being able to form an external air introducing opening in the double container comprised of the relatively-rigid outer container and the flexible inner container disposed inside the outer container and capacity-variable in response to an amount of a content thereof, and capable of being easily produced using a molding apparatus which is not largely different from a conventional type, significantly easily and reliably at a lower processing cost than that in conventional techniques.

Embodiments of First Aspect of Invention

In the method according to the first aspect of the present invention, the at least respective parts of the mating surfaces of the pair of partial molds may clamp the parison at two horizontally opposed lateral positions.

In the method according to the first aspect of the present invention, the at least respective parts of the mating surfaces of the pair of partial molds may clamp the parison at a single position.

The method according to the first aspect of the present invention may comprise forming a protruding tub piece from the parison, at a position outward of a portion of the parison clamped by the at least respective parts of the mating surfaces of the pair of partial molds.

In the method according to the first aspect of the present invention, a portion of the parison clamped by the at least respective parts of the mating surfaces of the pair of partial molds may correspond to a neck-shoulder portion of the double container.

In the method according to the first aspect of the present invention, a portion of the parison clamped by the at least respective parts of the mating surfaces of the pair of partial molds may correspond to a mouth portion of the double container.

In the method according to the first aspect of the present invention, a portion of the parison clamped by the at least respective parts of the mating surfaces of the pair of partial molds may correspond to the cap-receiving threaded portion of the double container.

Embodiments of Second Aspect of Invention

In the double container assembly according to the second aspect of the present invention, the site from which the clearance-caused burr has been removed may be located in any one of the cap-receiving threaded portion, the container body portion and the portion therebetween, at two horizontally opposed lateral positions.

In the double container assembly according to the second aspect of the present invention, the site from which the clearance-caused burr has been removed may be located in any one of the cap-receiving threaded portion, the container body portion and the portion therebetween, at a single position.

In the double container assembly according to the second aspect of the present invention, the site from which the clearance-caused burr has been removed may be located in a neck-shoulder portion of the double container.

In the double container assembly according to the second aspect of the present invention, the site from which the clearance-caused burr has been removed may be located in a mouth portion of the double container.

In the double container assembly according to the second aspect of the present invention, the site from which the clearance-caused burr has been removed may be located in the cap-receiving threaded portion of the double container.

BRIEF DESCRIPTION OF DRAWINGS

FIG. 4 is a vertical sectional view of a molded product produced by the double container assembly manufacturing method according to the first embodiment.

FIG. 5 is a horizontal sectional view of a neck-shoulder portion, taken h V-V in FIG. 1.

DESCRIPTION OF EMBODIMENTS

First Embodiment

Figure 1:
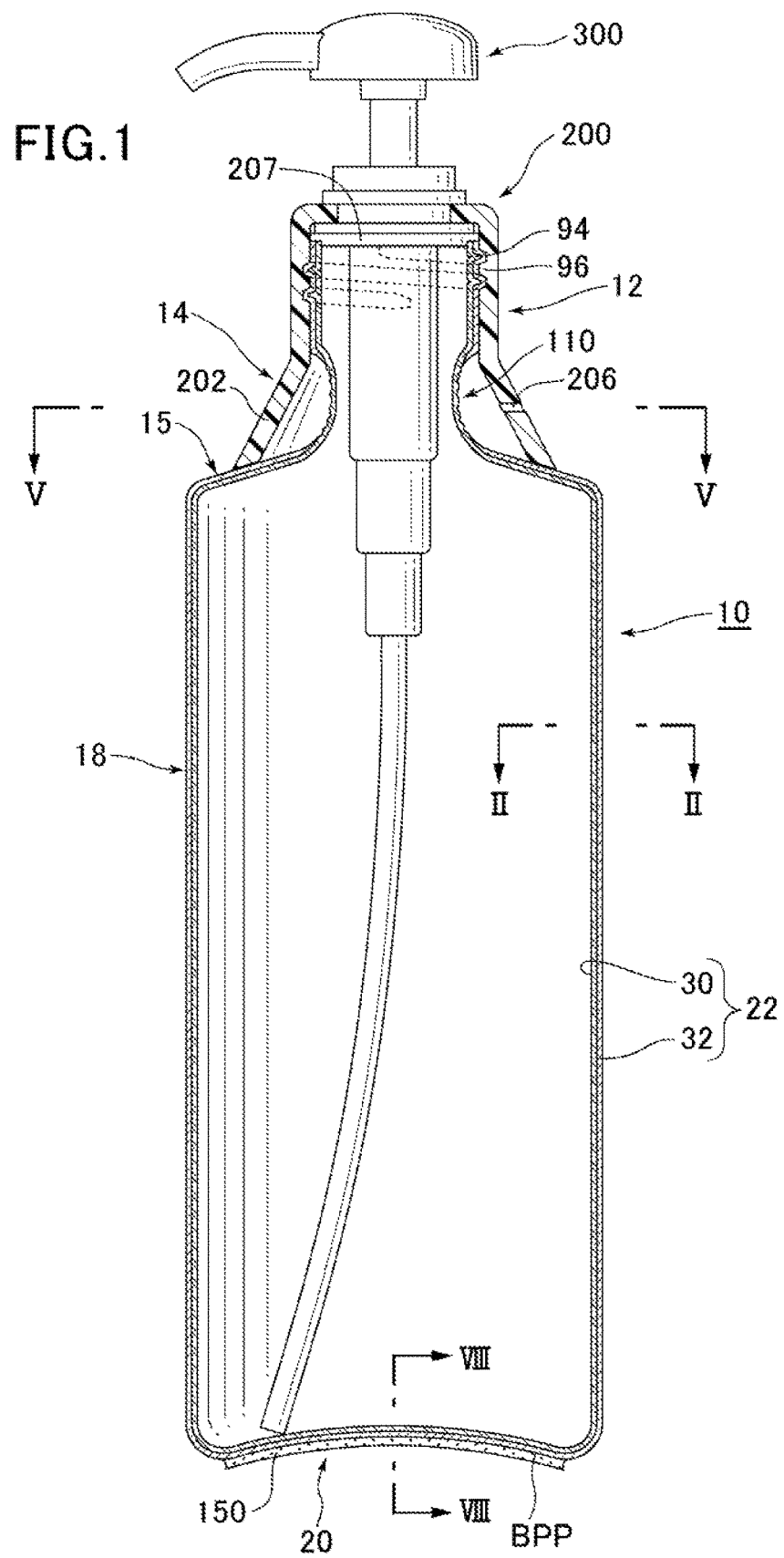
FIG. 1 is a vertical sectional view of a double container assembly manufactured by a double container assembly manufacturing method according to a first embodiment of the present invention.

As depicted in FIG. 1, a double container assembly manufactured by a double container assembly manufacturing method according to a first embodiment of the present invention comprises: a double container 10 having a mouth portion 12, a neck-shoulder portion 14, a cylindrical portion (container body portion) 18, and a bottom portion 20; and a cap 200 equipped with a pump 300.

Figure 2:
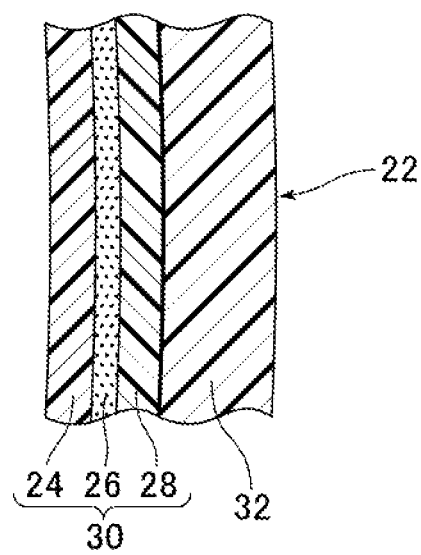
FIG. 2 is an enlarged sectional view of a cylindrical sidewall of a double container produced by the double container assembly manufacturing method according to the first embodiment, taken along the line II-II in FIG. 1.

In the double container 10 produced by the manufacturing method according to the first embodiment, for example, a cylindrical sidewall 22 of the cylindrical portion 18 comprises: a three-layered flexible inner layer 30 consisting of a low-density polyethylene (LDPE) sub-layer 24, an adhesive sub-layer 26 such as a polyolefin-based adhesive resin, and an ethylene-vinylalcohol copolymer (EVOH) sub-layer 28; and a rigid outer layer 32 made of polypropylene (PP), which are arranged in this order in an outward direction, as depicted in FIGS. 1 and 2. There is no adhesivity between the flexible inner layer 30 and the rigid outer layer 32, so that they are easily separable from each other.

Figure 3A:
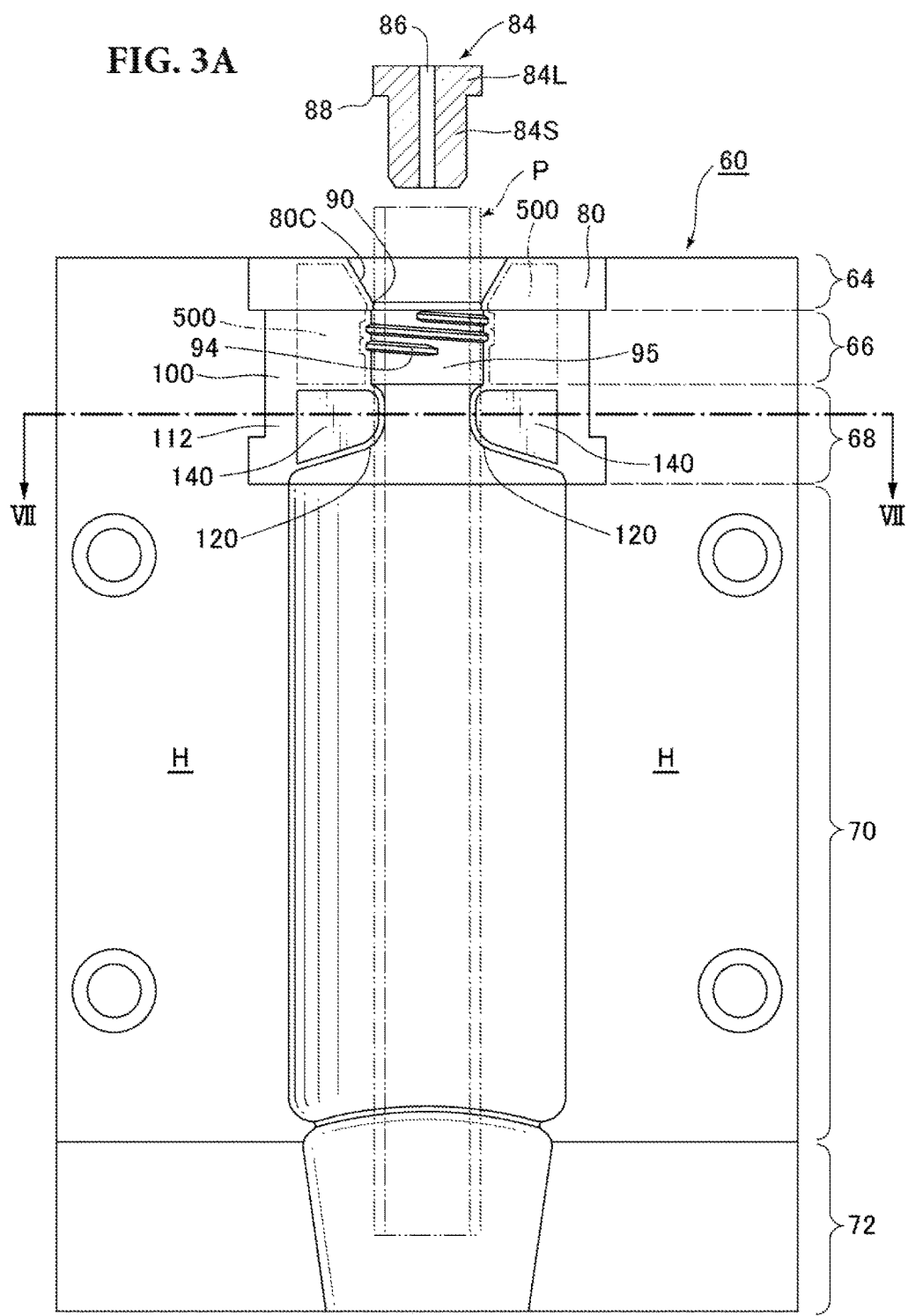
FIG. 3A is a front view of a pair of partial molds forming a split mold for use in the double container assembly manufacturing method according to the first embodiment, wherein the split mold is closed and a parison P is at a molding position.

In the manufacturing method according to the first embodiment, a split mold (not depicted) is formed by mating a pair of partial molds 60 whose front view is depicted in FIG. 3A, through mating surfaces H (see FIG. 6), and used. As depicted in FIG. 3A, the partial molds 60 have an open-end burr region 64, a mouth region 66, a neck shoulder region 68, a cylindrical sidewall region 70, and a bottom region 72.

The open-end burr region 64 serves as a means to form an unnecessary upper end (indicated by the two-dot chain line 92 in FIG. 4) of a parison P, which is to be ultimately cut off. In the open-end burr region 64, an open-end burr mold portion 80 acting as a mold is made of a steel material of SKD11, and implanted in an extension of the cylindrical sidewall region 70 made of 7075 aluminum.

As depicted in FIG. 3A, a blow pin 84 made of a metal and configured to be partially inserted into the parison P has a large-diameter tube portion 84L and a small-diameter tube portion 84S, and is centrally formed with a vertically-extending through-hole 86 for allowing blow air to pass therethrough.

Figure 3B:
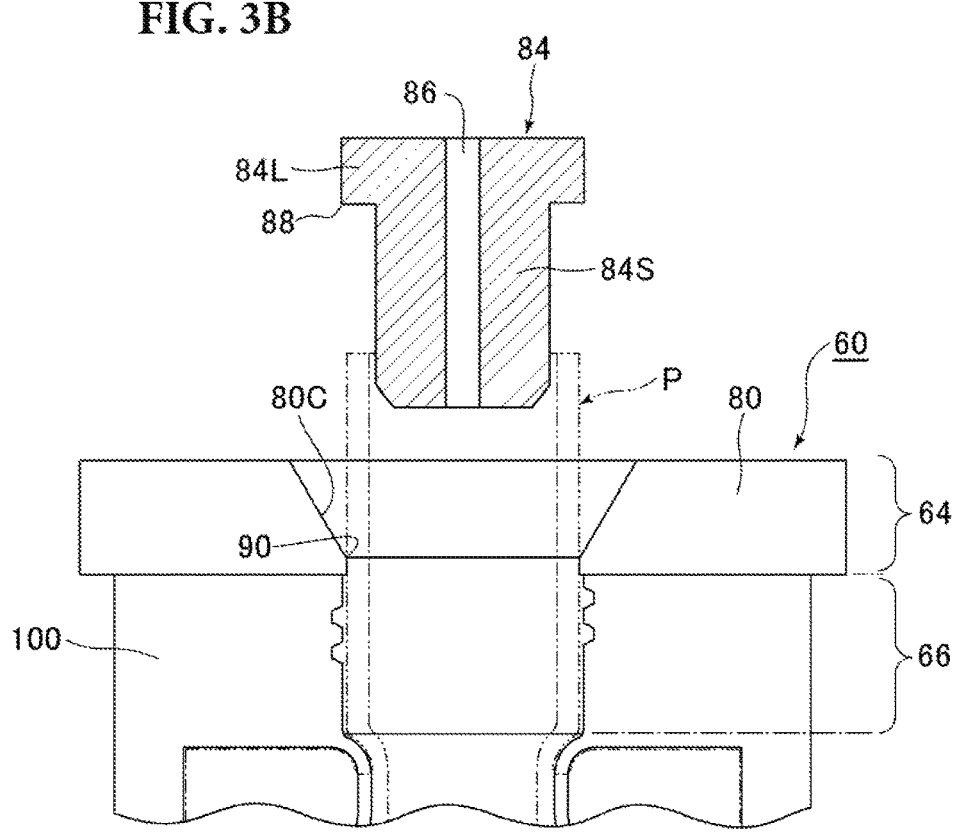
FIG. 3B is an explanatory fragmentary front view of the partial molds forming the split mold for use in the double container assembly manufacturing method according to the first embodiment, wherein a distal end of a blow pin is inserted into the parison P.

In the double container assembly manufacturing method according to the first embodiment, first of all, a distal end of the blow pin 84 is pushed into the parison P, as depicted in FIG. 3B.

Figure 3C:
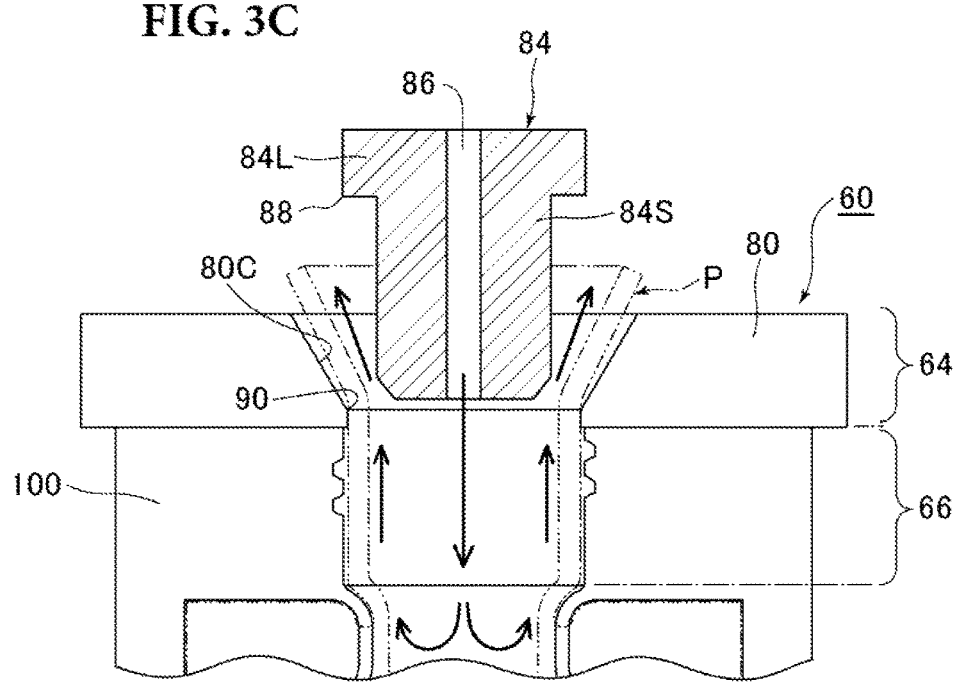
FIG. 3C is an explanatory fragmentary front view of the partial molds forming the split mold for use in the double container assembly manufacturing method according to the first embodiment, wherein the distal end of the blow pin is further inserted into the parison P.

Subsequently, as depicted in FIG. 3C, when air is blown into the parison P through the blow pin 84, an upper end of the parison P is expanded by blown-out air to form an upwardly-expanding (reverse taper) shape.

Figure 3D:
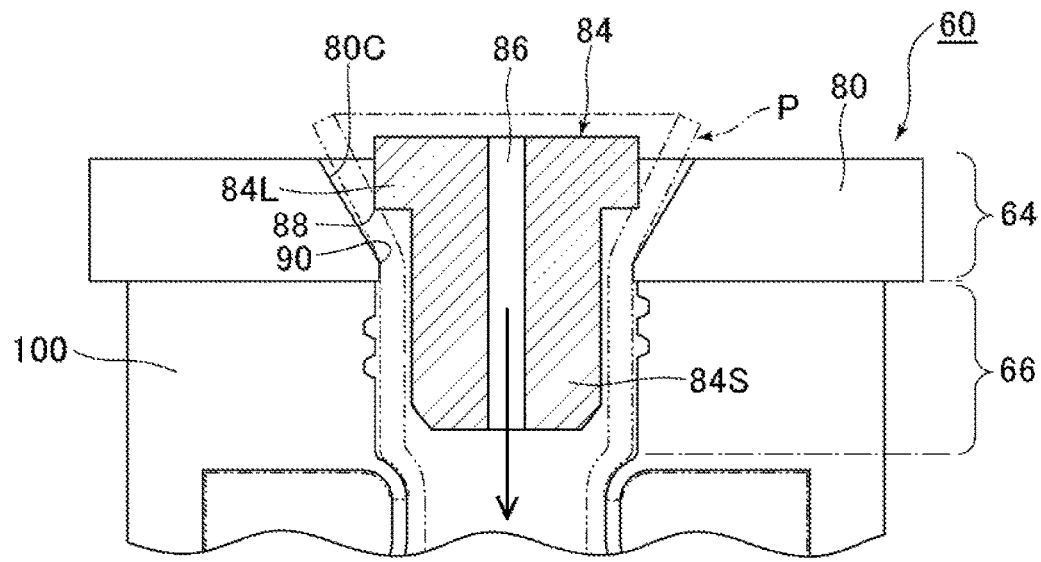
FIG. 3D is an explanatory fragmentary front view of the partial molds forming the split mold for use in the double container assembly manufacturing method according to the first embodiment, wherein the entire blow pin is inserted into the parison P.
Figure 3E:
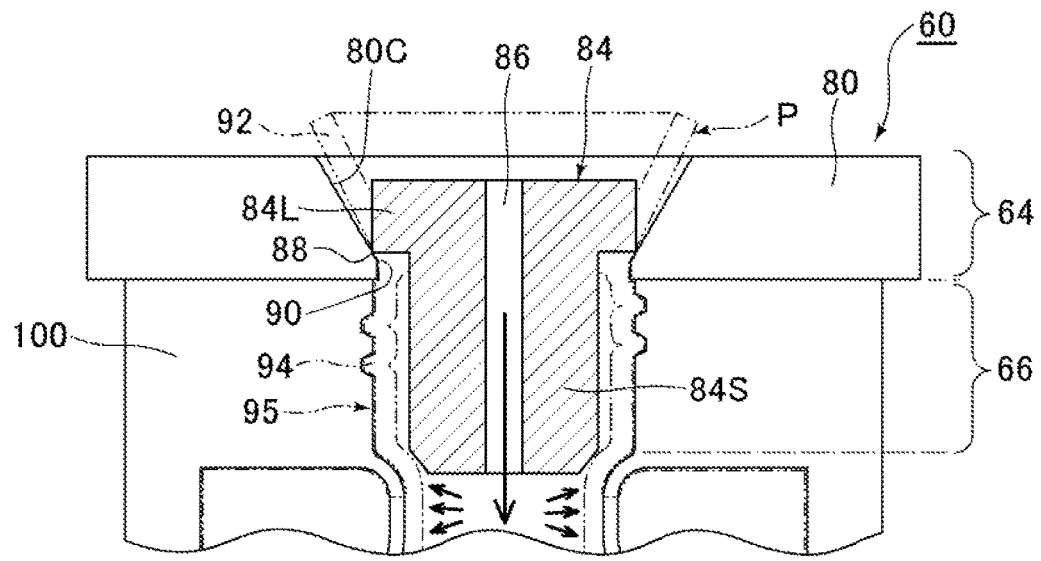
FIG. 3E is an explanatory fragmentary front view of the partial molds forming the split mold for use in the double container assembly manufacturing method according to the first embodiment, wherein the entire blow pin is further inserted into the parison P.

Subsequently, as depicted in FIG. 3d FIG. 3D, the blow pin 84 is moved such that a lower corner edge 88 of the large-diameter tube portion 84L of the blow pin 84 is brought into contact with the parison P, so that a gap between the blow pin 84 and the pa icon P is closed. As a result, under a pressure of air blown through the blow pin 84, the parison P is pressed against an inner surface of a mouth mold portion 100 in the mouth region 66, so that the mouth portion 12 is molded.

Subsequently, the blow pin 84 is moved such that the lower corner edge 88 of the large-diameter tube portion 84L of the blow pin 84 is brought into contact with an upwardly-expanding (reverse taper) conical surface 80c of the open-end burr mold portion 80 extending upwardly from an upper edge 90 of the inner surface of the mouth mold portion 100. As a result of this contact, the parison P is cut to remove an open-end burr 92.

The mouth mold portion 100 is made of a steel material of NAK55, and implanted in the extension of the cylindrical sidewall region 70 made of 7075 aluminum.

As depicted in FIG. 5, in the neck-shoulder portion 14 of the double container 10, the rigid outer layer 32 is disconnected in a plane A corresponding to the mating surfaces H of the partial molds forming the split mold (these molds are not depicted in FIG. 5) to form two outer layer slits 110, and the flexible inner layer 30 is exposed through each of the outer layer slits 110. A process for forming the outer layer slits 110 will be described later.

As mentioned above, there is no adhesivity between the flexible inner layer 30 and the rigid outer layer 32, so that they are easily separable from each other. Thus, when a volume of an internal space defined by the flexible inner layer 30 decreases, the flexible inner layer 30 is separated from the rigid outer layer 32, and external air enters a resulting space between the flexible inner layer 30 and the rigid outer layer 32, through the outer layer slits 110.

As depicted in FIG. 1, the cap 200 equipped with the pump 300 is threadingly engaged with (screwed onto) the mouth portion 12 of the formed double container 10. The cap 200 has an inner surface formed with a mouth-engageable thread 94 threadingly engageable with a cap-receiving thread 96 formed on the mouth portion 12. The cap 200 has a vent hole 206, and comprises a packing 207 disposed in an innermost region (inside an upper end) thereof. When the threading engagement between the cap-receiving thread 96 and the mouth-engageable thread 94 is almost completed, an upper edge of the mouth portion 12 comes into contact with the packing 207, and simultaneously a lower end of the cap 200 is brought into contact with an inclined section 15, i.e., a large-outer-diameter region, of the neck-shoulder portion 14.

When the cap 200 is more deeply screwed onto the mouth portion 12, the packing 207 is depressed, as depicted in FIG. 3. By the above threading engagement (screwing) and tightening operation, a force is applied to a region located between the mouth portion 12 and the inclined section 15 of the neck-shoulder portion 14 and formed with the outer layer slits 110, i.e., a small-outer-diameter region, in such a manner as to cause the mouth portion 12 and the inclined section 15 of the neck-shoulder portion 14 to be pulled away from each other and cause a diameter of the small-outer-diameter region to be increased. As a result, the outer layer slits 110 are fully opened or increased in opening area, to enable external air to easily flow into a space between the flexible inner layer 30 and the rigid outer layer 32 through the outer layer slits 110.

Figure 6:
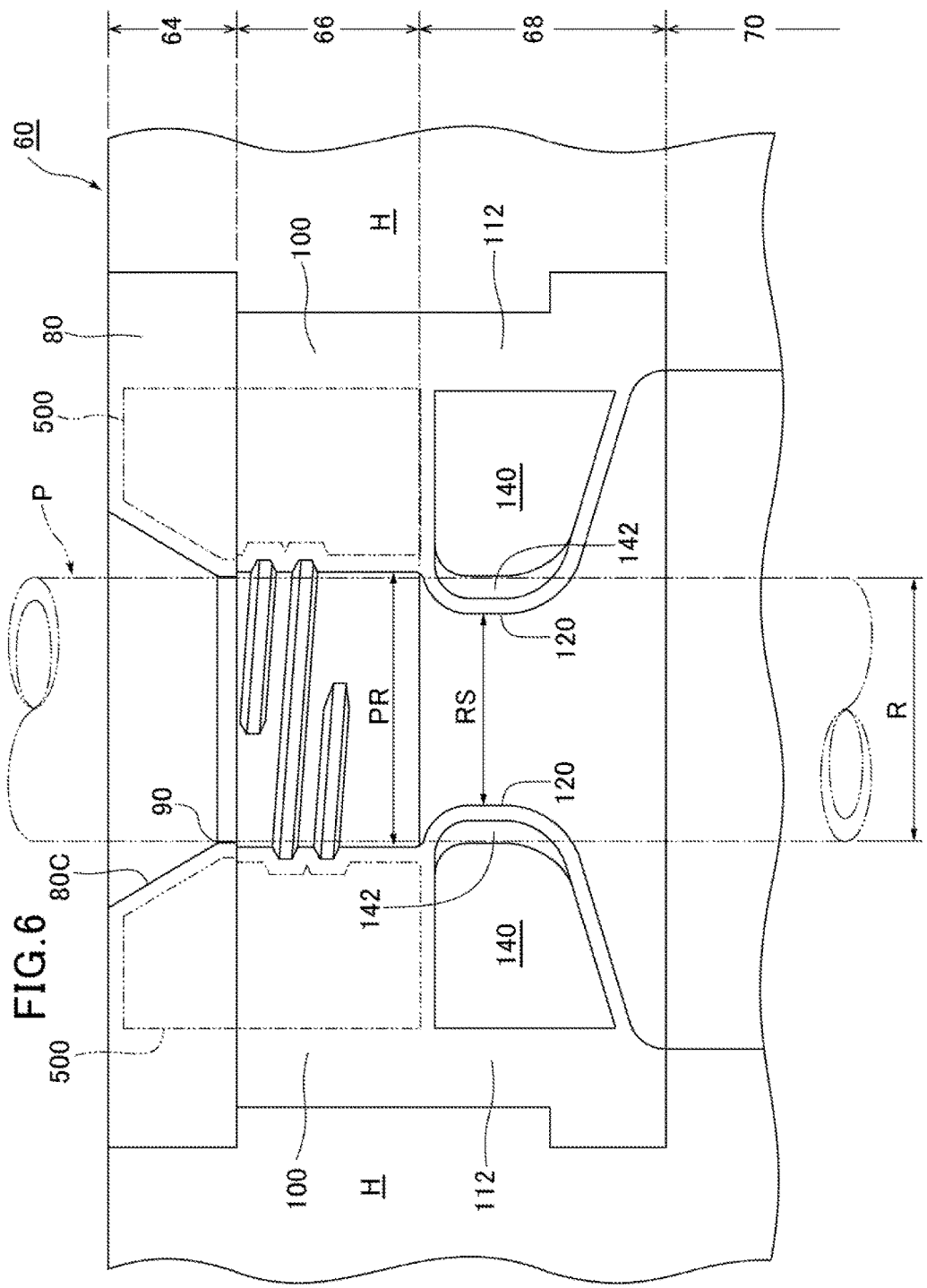
FIG. 6 is an explanatory diagram of the double container assembly manufacturing method according to the first embodiment.
Figure 7A:
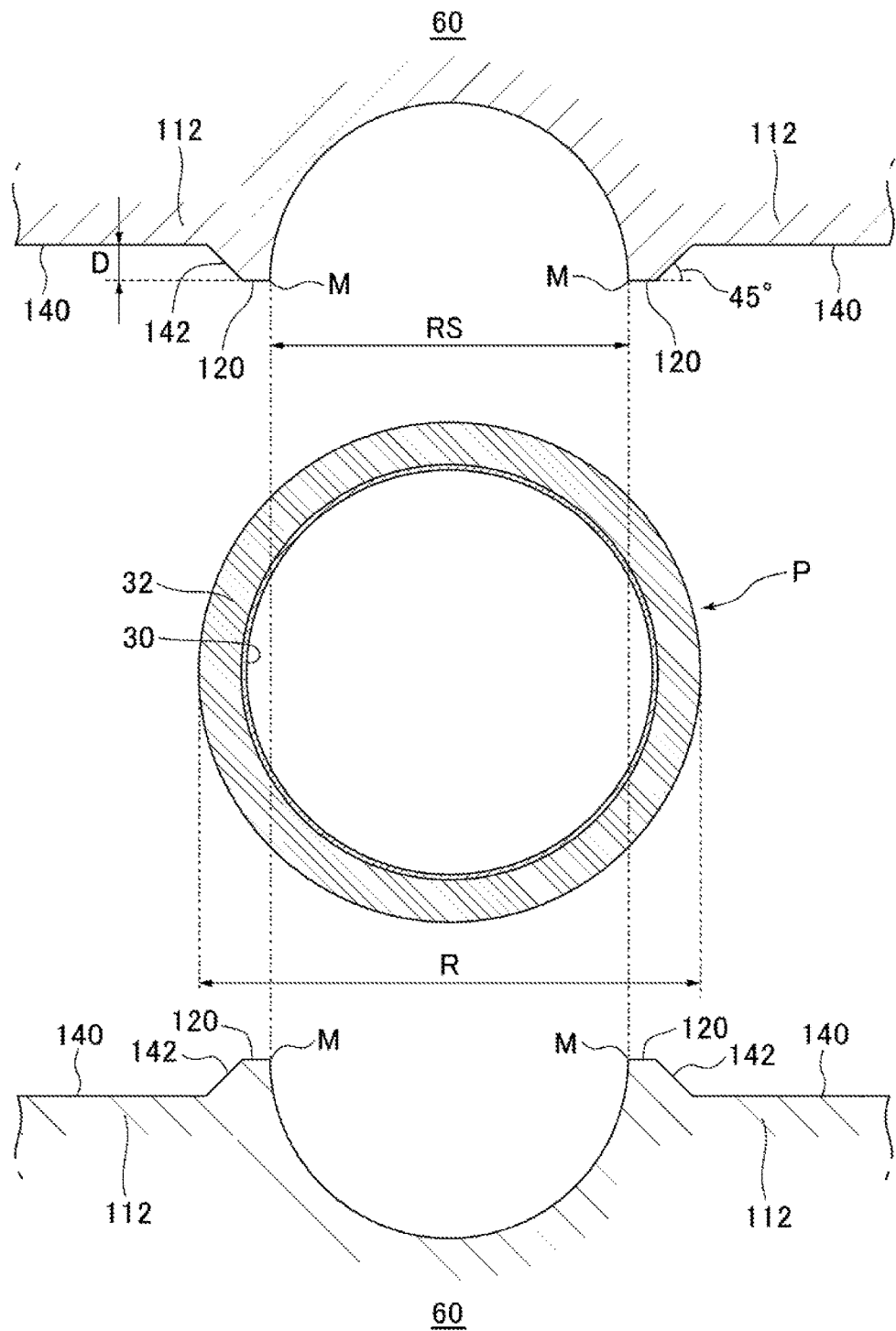
FIG. 7A is a sectional view taken along the line VII-VII in FIG. 3A, for explaining a process of forming a clearance-caused burr, in the double container assembly manufacturing method according to the first embodiment, wherein the split mold is at a position before clamping the parison P.

As depicted in FIG. 6 and FIG. 7(a), a neck-shoulder mold portion 112 for molding the neck-shoulder portion 14 of the double container 10 is made of a steel material of NAK55, and formed integrally with the mouth mold portion 100, and implanted in the extension of the cylindrical sidewall region 70 made of 7075 aluminum. In the neck-shoulder region 68 of the partial molds 60, a molding surface for the neck-shoulder portion 14 is configured, for example, such that a distance RS between opposed innermost edges of a region for forming the outer layer slits 110 in each of the mating surfaces H is 71.4%, with respect to an outer diameter R of the parison P.

More specifically, in the neck-shoulder region 68 of the partial molds 60, the distance RS between opposed innermost edges of the region for forming the outer layer slits 110 in each of the mating surfaces H may be set in the range of 99% to 50%, preferably 95% to 60%, more preferably 95% to 70%, with respect to the outer diameter R of the parison P. This distance RS is determined while taking into account an environmental temperature, a temperature, thickness, diameter of the parison P and the like, so as to obtain an advantage of being able to optimize a size of the outer layer slit 110, and facilitate cut-off of an aftermentioned clearance-caused burr.

In one example of numerical values of the neck-shoulder region 68 of the partial molds 60 for molding the neck-shoulder portion 14 of the double container 10, when the parison P has an inner diameter of 17.0 mm and an outer diameter R of 21.0 mm, and the mouth portion 12 of the molded product has an outer diameter PR of 21.5 mm and an inner diameter of 17.3 mm, a distance RS between opposed edges of a region for forming the outer layer slits 110 in each of the mating surfaces H at a minimum diameter position of the neck-shoulder region 68, i.e., a diameter RS of a cavity of the neck-shoulder mold portion 112, is 15.0 mm (71.4%, with respect to the outer diameter of the parison P as mentioned above), as depicted in FIGS. 6 and 7a. During molding, a temperature of the parison P is 190.0° C., and a mold temperature is 19.0° C.

A horizontal width of each of two clamp regions 120 for forming the outer layer slits 110 in each of the mating surfaces H is 0.2 mm. A burr-forming clearance recess 140 for forming a clearance-caused burr 130 is formed outside each of the clamp regions 120 in each of the mating surfaces H (see FIGS. 4 and 6). As depicted in FIG. 7A, the burr-forming clearance recess 140 has a depth D of 1.5 mm, and an entire peripheral region of the burr-forming clearance recess 140 is formed as an inclined face 142 inclined by 45 degrees with respect to the mating surface H.

A process of forming the outer layer slits 110 in the double container 10 to be produced by the manufacturing method according to the first embodiment is as follows.

As depicted in FIGS. 3a, 6 and 7a, a parison P in a moldable state is disposed between the pair of partial molds 60 positioned opposed to each other, in an axially aligned manner.

Alternatively, a parison P in a moldable state may be disposed between the pair of partial molds 60 positioned opposed to each other, eccentrically with respect to the pair of partial molds 60, to thereby form only one clearance-caused burr, for example.

Further, the clearance-caused burr may be formed in any suitable portion other than the neck-shoulder portion, such as the mouth portion or the cylindrical portion.

Figure 7B:
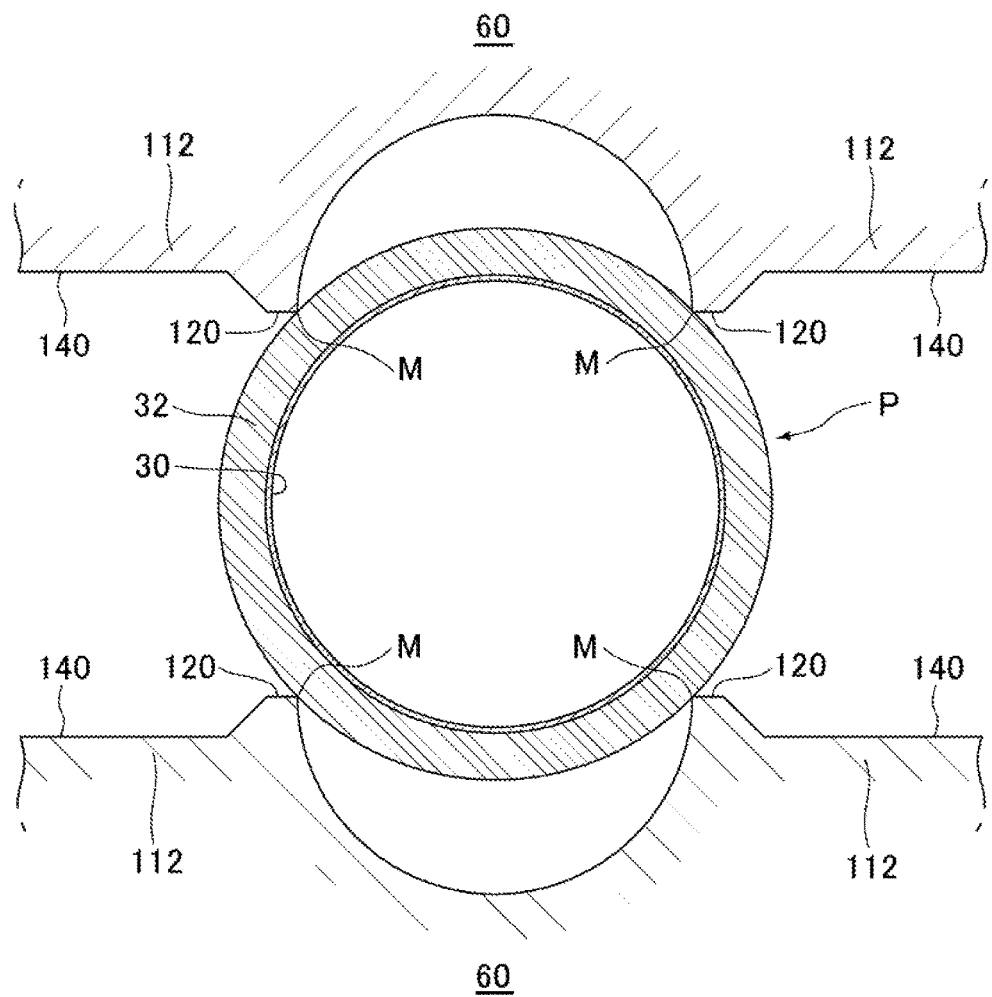
FIG. 7B is a sectional view taken along the line VII-VII in FIG. 3A, for explaining the process of forming a clearance-caused burr, in the double container assembly manufacturing method according to the first embodiment, wherein the split mold is brought into contact with the parison P.

Subsequently, as depicted in FIG. 7B, the pair of partial molds 60 are moved toward the parison P to make up a split mold. When a distance between the mating surfaces H of the pair of partial molds 60 becomes a given value, e.g., 8.0 mm, innermost edges M in the mating surfaces H are brought into contact with an outer peripheral surface of the parison P, on each of right and left sides, as depicted in FIG. 7B.

Figure 7C:
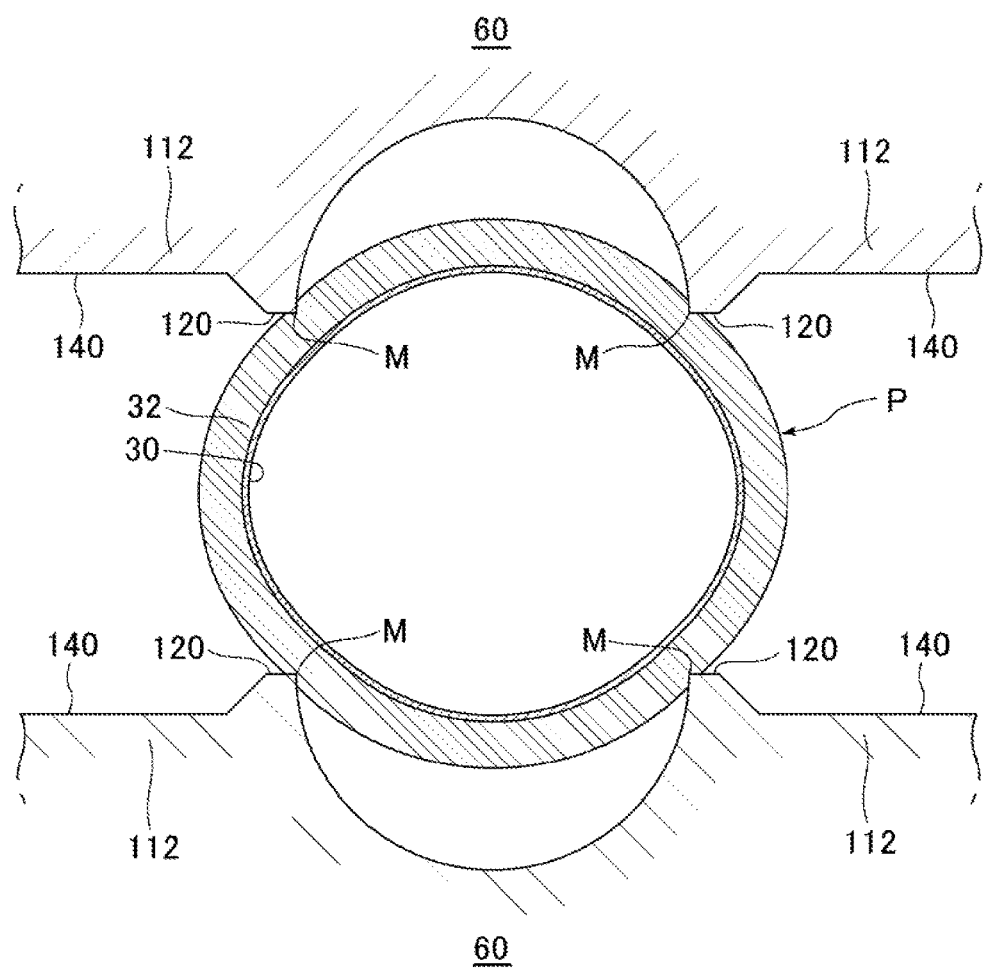
FIG. 7c is a sectional view taken along the line VII-VII in FIG. 3A, for explaining the process of forming a clearance-caused burr, in the double container assembly manufacturing method according to the first embodiment, wherein the split mold starts to deform the parison P.

Subsequently as depicted in FIG. 7C, when the pair of partial molds 60 are moved to come closer to each other, the parison P is clamped between the innermost edges M of the mating surfaces H and between regions adjacent to the innermost edges M of the mating surfaces H, i.e., the clamp regions 120. The clamped portion of the parison P is partially pushed outside the clamp regions 120 of the pair of mating surfaces H, while the flexible inner layer 30 and the rigid outer layer 32 are maintained in an integral state.

Figure 7D:
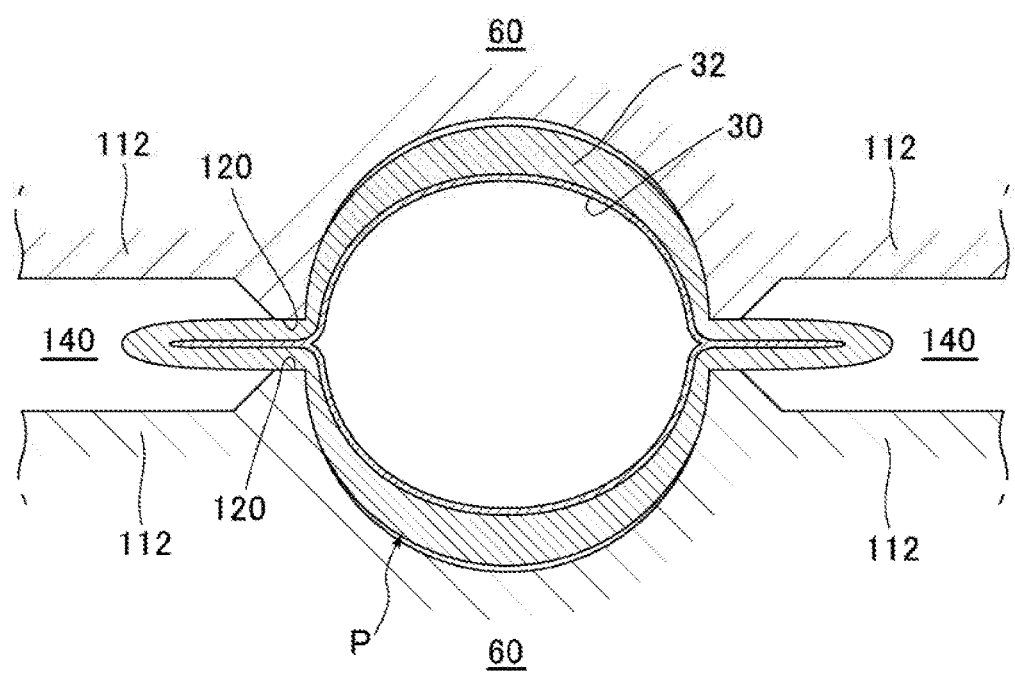
FIG. 7D is a sectional view taken along the line VII-VII in FIG. 3A, for explaining the process of forming a clearance-caused burr, in the double container assembly manufacturing method according to the first embodiment, wherein the split mold clamps the parison P.

Subsequently, as depicted in FIG. 7D, when the pair of partial molds 60 are moved to come much closer to each other, the clamp regions 120 of the mating surfaces H clamp the flexible inner layer 30 and the rigid outer layer 32 such that the flexible inner layer 30 is double-folded in a central region, and the rigid outer layer 32 covers both sides of the double-folded flexible inner layer 30. More specifically, the rigid outer layer 32 is crushed to extend inside the burr-forming clearance recess 140. On the other hand, when double-folded portions of the flexible inner layer 30 are brought into contact with each other, they are bonded by its adhesivity and integrated together.

Figure 7E:
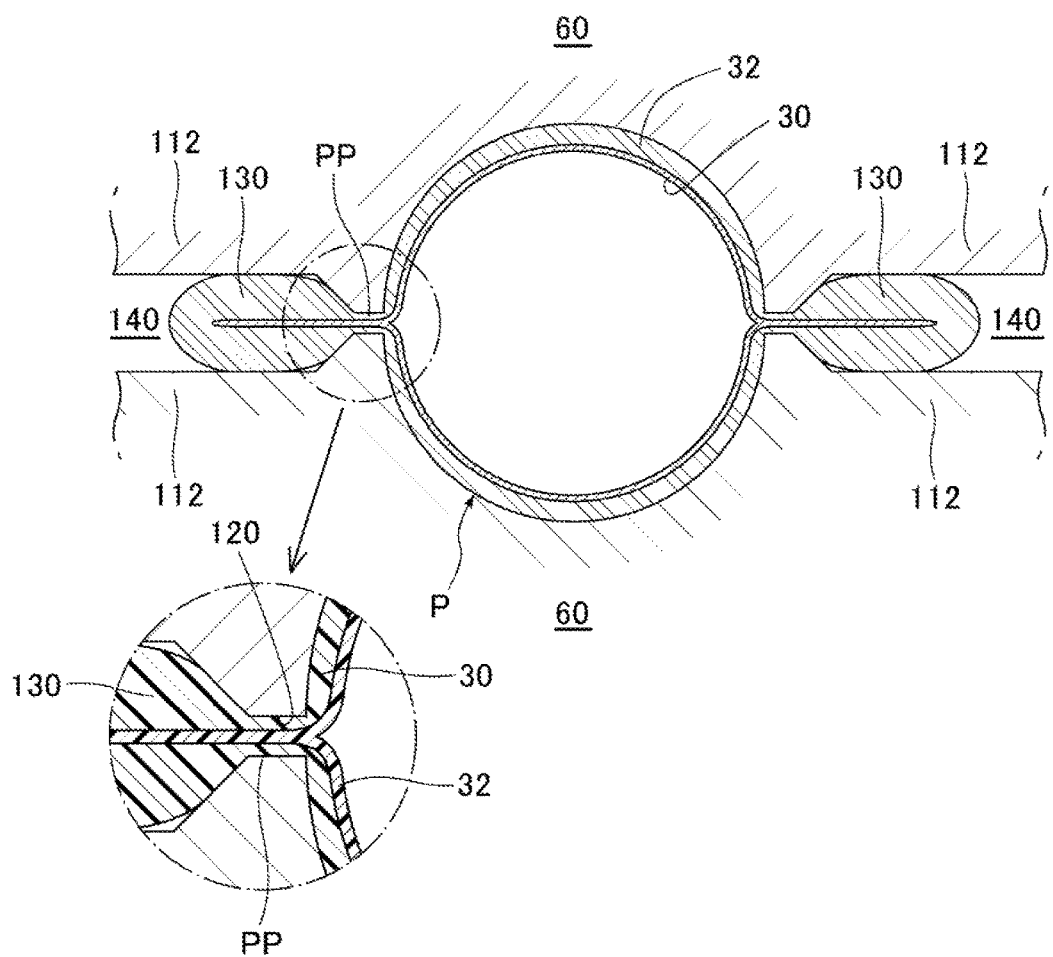
FIG. 7E is a sectional view taken along the line VII-VII in FIG. 3A, for explaining the process of forming a clearance-caused burr, in the double container assembly manufacturing method according to the first embodiment, wherein the split mold forms the clearance-caused burr and a pinched section.

Subsequently, as depicted in FIGS. 4 and 7e, when the pair of partial molds 60 are moved to come much closer to each other and pressed against each other by a force, for example, of 2 ton, the distance between the clamp regions in the mating surfaces H becomes about 0.05 to 0.3 mm. The pushed-out portion of the parison P is formed as a clearance-caused burr 130 through a pinched section PP. Each of the clamp regions 120 of the mating surfaces of the partial molds of the split mold is flat, so that, when the partial molds are mated to make up the split mold, the pinched section PP is formed in a flat plate shape. As used herein, the term "pinched section PP" means an extremely thin portion of the parison P which is formed between the clamp regions 120 when the clamp regions 120 clamp the parison P.

The bottom portion 20 of the double container 10 is formed such that, when the partial molds 60 are joined together to make up the sprit mold, the bottom region 72 of the partial molds 60 clamps an intermediate portion of the parison P. A portion of the bottom region 72 acting as a mold is made of a steel material of NAK55 as in the case of the mouth mold portion 100 and the neck-shoulder mold portion 112, and implanted in the extension of the cylindrical sidewall region 70 made of 7075 aluminum.

As depicted in FIG. 4, a portion of the parison P located below the bottom portion 20 is formed as a bottom pinched section BPP and a bottom burr 144. The clearance-caused burr 130 and the bottom burr 144 are easily removed to complete a double container.

Figure 8:
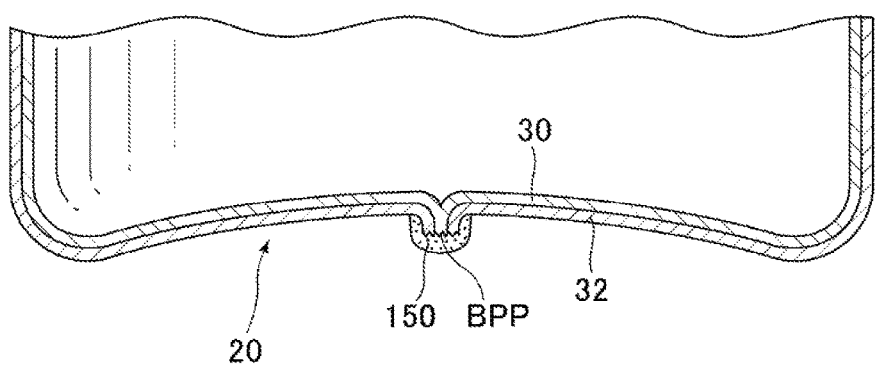
FIG. 8 is a vertical sectional view of a bottom portion, taken along the line VIII-VIII in FIG. 1.

As depicted in FIG. 8, a central laterally-extending area of the bottom portion is formed such that front and rear regions of the parison P with respect to the mating surfaces H of the split mold are pressed against each other and integrated, and the outer layers 32 exist on both sides of the integrated area. Thus, in this state, there is no adhesivity between the flexible inner layer 30 and the rigid outer layer 32, and they can be easily separable from each other. Therefore, it is highly likely that a gap is formed between the flexible inner layer 30 and the rigid outer layer 32 in the bottom portion 20. That is, there is a risk of causing an undesirable situation, for example, where water or the like is sucked through the gap. In order to eliminate this risk, ends of the flexible inner layer 30 and the rigid outer layers 32 in the bottom portion 20 are covered by an adhesive 150.

Second Embodiment

A double container 10 produced by a double container assembly manufacturing method according to a second embodiment of the present invention comprises a flexible inner layer 30 made of polyamide (PA), and a rigid outer layer 32 made of polypropylene (PP). There is no adhesivity between the flexible inner layer 30 and the rigid outer layer 32, so that they are easily separable from each other.

As regards the neck-shoulder region 68 of the partial molds 60 for molding the neck-shoulder portion 14 of the double container 10, when the parison P has an inner diameter of 16.5 mm and an outer diameter R of 20.5 mm, and the mouth portion 12 of the molded product has an outer diameter PR of 21.5 mm and an inner diameter of 17.3 mm, a distance RS between opposed edges of a region for forming the outer layer slits 110 in each of the mating surfaces H at a minimum diameter position of the neck-shoulder region 68, i.e., a diameter RS of a cavity of the neck-shoulder mold portion 112, is 15.0 mm (72.1%, with respect to the outer diameter of the parison P). During molding, the temperature of the parison P is 190.0° C., and the mold temperature is 19.0° C.

The width of each of the clamp regions 120 for forming the outer layer slits 110 in each of the mating surfaces H is 0.1 mm. The burr-forming clearance recess 140 for forming the clearance-caused burr 130 is formed outside the clamp region 120 in each of the mating surfaces H (see FIG. 6). The burr-forming clearance recess 140 has a depth D of 2.0 mm, and the entire peripheral region of the burr-forming clearance recess 140 is formed as an inclined surface 142 inclined by 30 degrees with respect to the mating surface H.

Third Embodiment

A double container 10 produced by a double container assembly manufacturing method according to a third embodiment comprises: a three-layered flexible inner layer consisting of a low-density polyethylene (LDPE) sub-layer, an adhesive sub-layer such as a polyolefin-based adhesive resin, and an ethylene-vinylalcohol copolymer (EVOH) sub-layer; and a rigid outer layer 32 made of polycarbonate (PC), which are arranged in this order in an outward direction. There is no adhesivity between the flexible inner layer 30 and the rigid outer layer 32, so that they are easily separable from each other.

The mouth mold portion 100 and the neck-shoulder mold portion 112 are made of dice steel SKD11, and integrally formed.

As regards the neck-shoulder region 68 of the partial molds 60 for molding the neck-shoulder portion 14 of the double container 10, when the parison P has an inner diameter of 23.5 mm and an outer diameter R of 28.5 mm, and the mouth portion 12 of the molded product has an outer diameter PR of 29.0 mm and an inner diameter of 23.5 mm, a distance RS between opposed edges of a region for forming the outer layer slits 110 in each of the mating surfaces H at a minimum diameter position of the neck-shoulder region 68, i.e., a diameter RS of a cavity of the neck-shoulder mold portion 112, is 20.0 mm (70.1%, with respect to the outer diameter of the parison P). During molding, the temperature of the parison P is 210.0° C., and the mold temperature is 19.0° C.

The width of each of the clamp regions 120 for forming the outer layer slits 110 in each of the mating surfaces H is 0.1 mm. The burr-forming clearance recess 140 for forming the clearance-caused burr 130 is formed outside the clamp region 120 in each of the mating surfaces H (see FIG. 6). The burr-forming clearance recess 140 has a depth D of 2.0 mm, and the entire peripheral region of the burr-forming clearance recess 140 is formed as an inclined surface 142 inclined by 30 degrees with respect to the mating surface H.

Fourth Embodiment

A double container 10 produced by a double container assembly manufacturing method according to a fourth embodiment comprises: a four-layered flexible inner layer consisting of a blend sub-layer of a low-density polyethylene (LDPE) and an adhesive resin, an ethylene-vinylalcohol copolymer (EVOH) sub-layer, an adhesive sub-layer such as a polyolefin-based adhesive resin, and an ethylene-vinylalcohol copolymer (EVOH) sub-layer; and a rigid outer layer 32 made of polypropylene (PP), which are arranged in this order in an outward direction. There is no adhesivity between the flexible inner layer 30 and the rigid outer layer 32, so that they are easily separable from each other.

The mouth mold portion 100 and the neck-shoulder mold portion 112 are made of pre-hardened steel (NAK55), and integrally formed.

As regards the neck-shoulder region 68 of the partial molds 60 for molding the neck-shoulder portion 14 of the double container 10, when the parison P has an inner diameter of 15.5 mm and an outer diameter R of 20.0 mm, and the mouth portion 12 of the molded product has an outer diameter PR of 20.5 mm and an inner diameter of 17.3 mm, a distance RS between opposed edges of a region for forming the outer layer slits 110 in each of the mating surfaces H at a minimum diameter position of the neck-shoulder region 68, i.e., a diameter RS of a cavity of the neck-shoulder mold portion 112, is 13.0 mm (65.0%, with respect to the outer diameter of the parison P). During molding, the temperature of the parison P is 190.0° C. and the mold temperature is 19.0° C.

The width of each of the clamp regions 120 for forming the outer layer slits 110 in each of the mating surfaces H is 0.1 mm. The burr-forming clearance recess 140 for forming the clearance-caused burr 130 is formed outside the clamp region 120 in each of the mating surfaces H (see FIG. 6). The burr-forming clearance recess 140 has a depth D of 1.5 mm, and the entire peripheral region of the burr-forming clearance recess 140 is formed as an inclined surface 142 inclined by 60 degrees with respect to the mating surface H.

In the first to fourth embodiments, the burr-forming clearance recess 140 is formed in each of the mating surfaces H. In addition, an excess parison recess 500 for receiving a parison material running off from the split mold during blowing may be formed in the vicinity of the open-end burr region 64 and the mouth region 66 (see FIG. 3A).

Fifth Embodiment

Figure 9:
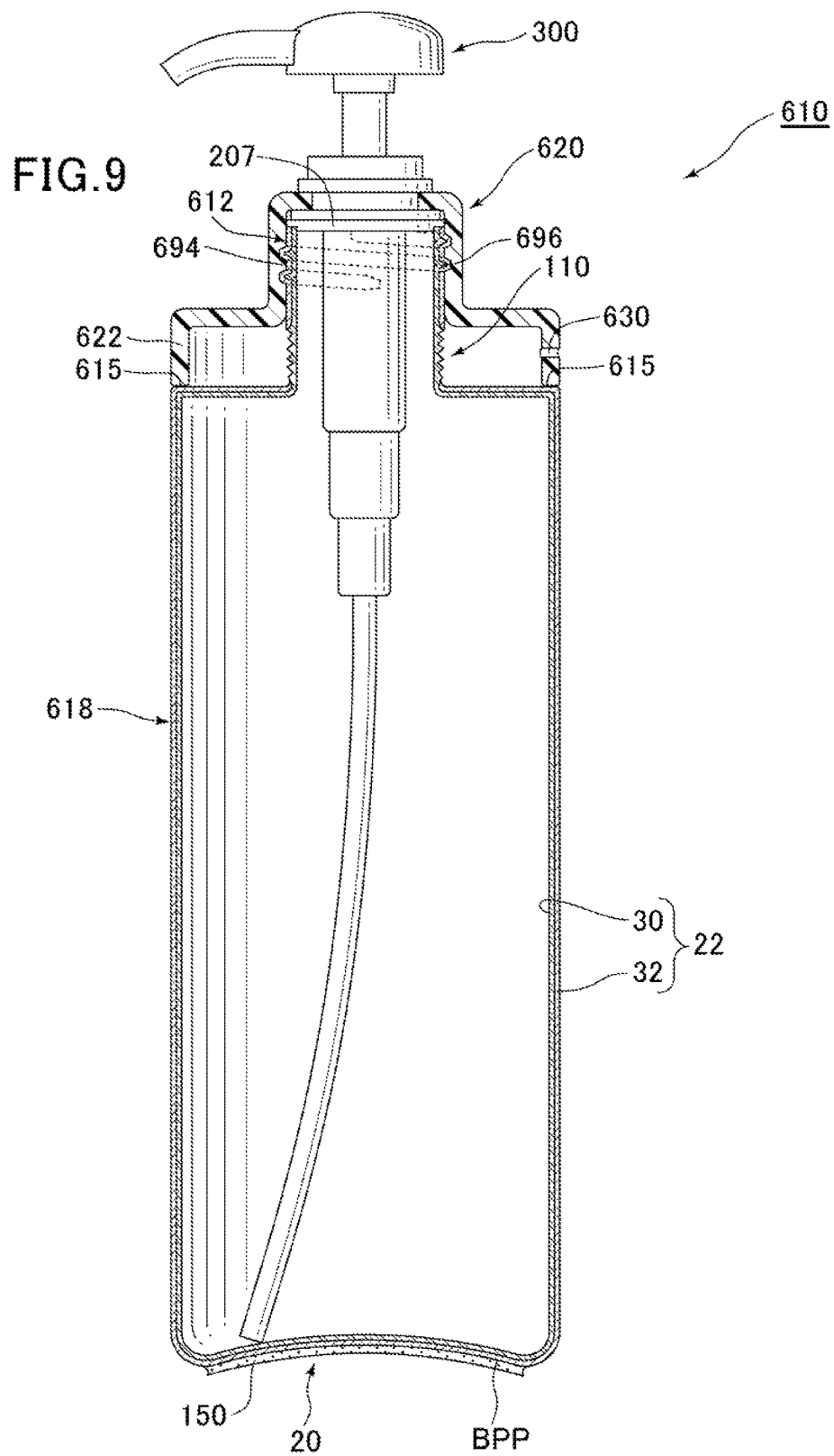
FIG. 9 is a sectional view of a double container assembly according to a fifth embodiment of the present invention.

As depicted in FIG. 9, a double container assembly according to a fifth embodiment of the present invention is different from the double container assembly in the first embodiment, in terms of configurations of an upper end of a cylindrical portion 618 and a cap 620. Thus, in FIG. 9, a component or element of the double container assembly according to the fifth embodiment identical to that of the double container assembly in the first embodiment is assigned with the same reference sign as that in the first embodiment, and its description will be omitted.

A cap 620 equipped with a pump 300 is threadingly engaged with (screwed onto) a mouth portion 612 of a double container 610, as depicted in FIG. 9. The cap 620 has an inner surface formed with a mouth-engageable thread 696 threadingly engageable with a cap-receiving thread 694 formed on the mouth portion 612. The cap 620 has a vent hole 630, and comprises a packing 207 disposed in an innermost region (inside an upper end) thereof.

When the threading engagement between the cap-receiving thread 694 and the mouth-engageable thread 696 is almost completed, an upper edge of the mouth portion 612 comes into contact with the packing 207, and simultaneously a lower end of the cap 620 is brought into contact with a peripheral edge 615 of a flat (horizontally-extending) upper end of a cylindrical portion 618 of the double container 610.

When the cap 620 is more deeply screwed onto the mouth portion 612, the packing 207 is depressed, as depicted in FIG. 9. By the above threading engagement (screwing) and tightening operation, a force (tension) is applied to a region located between the mouth portion 612 and the peripheral edge 615 of the flat upper end of the cylindrical portion 618 and formed with outer layer slits 110, i.e., a small-outer-diameter region, in such a manner as to cause the mouth portion 612 and the cylindrical portion 618 to be pulled away from each other and cause a diameter of the small-outer-diameter region to be increased. As a result, the outer layer slits 110 are fully opened or increased in opening area, to enable external air to easily flow into a space between a flexible inner layer 30 and a rigid outer layer 32 through the outer layer slits 110.

Sixth Embodiment

Figure 10:
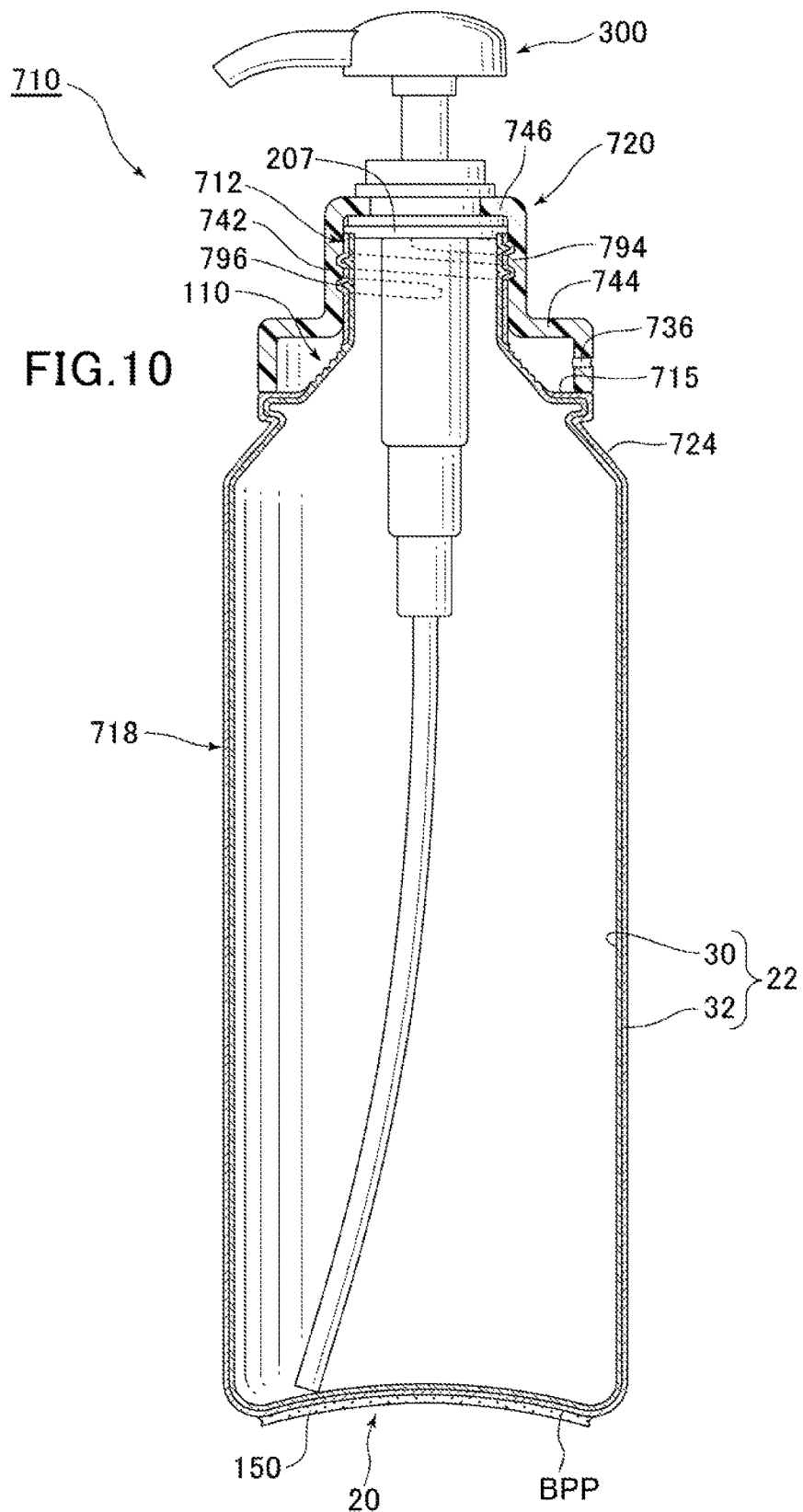
FIG. 10 is a sectional view of a double container assembly according to a sixth embodiment of the present invention.

As depicted in FIG. 10, a double container assembly according to a sixth embodiment of the present invention is different from the double container assembly in the first embodiment, in terms of configurations of an upper end of a cylindrical portion 718 and a cap 720. Thus, in FIG. 10, a component or element of the double container assembly according to the sixth embodiment identical to that of the double container assembly in the first embodiment is assigned with the same reference sign as that in the first embodiment, and its description will be omitted.

A cap 720 equipped with a pump 300 is threadingly engaged with (screwed onto) a mouth portion 712 of a double container 710, as depicted in FIG. 10. The cap 720 has an inner surface formed with a mouth-engageable thread 796 threadingly engageable with a cap-receiving thread 794 formed on the mouth portion 712. The cap 720 has a vent hole 730, and comprises a packing 207 disposed in an innermost region (inside an upper end) thereof.

When the threading engagement between the cap-receiving thread 794 and the mouth-engageable thread 796 is almost completed, an upper edge of the mouth portion 712 comes into contact with the packing 207, and simultaneously a lower end of the cap 720 is brought into contact with an intermediate flat annular strip region 715 formed at a vertically-intermediate position of a conical upper end of a cylindrical portion 718 of the double container 710.

When the cap 720 is more deeply screwed onto the mouth portion 712, the packing 207 is depressed, as depicted in FIG. 10. By the above threading engagement (screwing) and tightening operation, a force (tension) is applied to a region located between the mouth portion 712 and the intermediate flat annular strip region 715 of the cylindrical portion 718 and formed with outer layer slits 110, i.e., a small-outer-diameter region, in such a manner as to cause the mouth portion 712 and the intermediate flat annular strip region 715 of the cylindrical portion 718 to be pulled away from each other and cause a diameter of the small-outer-diameter region to be increased. As a result, the outer layer slits 110 are fully opened or increased in opening area, to enable external air to easily flow into a space between a flexible inner layer 30 and a rigid outer layer 32 through the outer layer slits 110.

LIST OF REFERENCE SIGNS

P: parison
PP: pinched section
10: double container
18: cylindrical portion
22: cylindrical sidewall
24: low-density polyethylene (LDPE) sub-layer
26: adhesive sub-layer
28: ethylene-vinylalcohol copolymer (EVOH) sub-layer
30: flexible inner layer
32: rigid outer layer
60: partial mold
64: open-end burr region
66: mouth region
68: neck-shoulder region
70: cylindrical sidewall region
72: bottom region
80: open-end burr mold portion
82: pin
86: vertically-extending through-hole
88: lower corner edge
92: open-end burr
100: mouth mold portion
110: outer layer slit
112: neck-shoulder mold portion
120: clamp region
130: clearance-caused burr
140: burr-forming clearance recess
142: inclined surface
144: bottom bur
500: excess parison recess

The invention claimed is:

1. A method for manufacturing a double container assembly comprising a double container and a threaded cap, wherein the double container is molded, using a split mold as a combination of a pair of partial molds, from a parison comprising at least two layers of an inner layer and an outer layer forming, respectively, a rigid outer container layer and a flexible inner container layer which are separable from each other after molding, the double container being configured to introduce external air into a space between the rigid outer container layer and the flexible inner container layer to enable a capacity of the flexible inner container layer to be reduced, while retaining a shape of the rigid outer container layer, the method comprising:

a step A of: forming a large-outer-diameter region having a given outer diameter, in a cap-receiving threaded portion or a container body portion of the double container or a portion of the double container therebetween, and a small-outer-diameter region having an outer diameter less than that of the large-outer-diameter region, in a portion of the double container between the large-outer-diameter region and the cap-receiving threaded portion; and, during a course of moving the pair of partial molds to come close to each other so as to combine them together to make up the split mold, clamping a portion of the parison corresponding to the small-outer-diameter region by at least respective parts of mating surfaces of the pair of partial molds, to thereby form a clearance-caused burr;

a step B of removing the clearance-caused burr formed in the step A; and a step C of forming the threaded cap such that, when the threaded cap is threadingly engaged with the cap-receiving threaded portion, it applies a tension to the small-outer-diameter region from which the clearance-caused burr has been removed, in a direction causing the cap-receiving threaded portion and the large-outer-diameter region to be pulled away from each other.

2. The method as recited in claim 1, wherein the at least respective parts of the mating surfaces of the pair of partial molds clamp the parison at two horizontally opposed lateral positions.

3. The method as recited in claim 1, wherein the at least respective parts of the mating surfaces of the pair of partial molds clamp the parison at a single position.

4. The method as recited in claim 1, which comprises forming a protruding tub piece from the parison, at a position outward of a portion of the parison clamped by the at least respective parts of the mating surfaces of the pair of partial molds.

5. The method as recited in claim 1, wherein a portion of the parison clamped by the at least respective parts of the mating surfaces of the pair of partial molds corresponds to a neck-shoulder portion of the double container.

6. The method as recited in claim 1, wherein a portion of the parison clamped by the at least respective parts of the mating surfaces of the pair of partial molds corresponds to a mouth portion of the double container.

7. The double container manufacturing method as recited in claim 1, wherein a portion of the parison clamped by the at least respective parts of the mating surfaces of the pair of partial molds corresponds to the cap-receiving threaded portion of the double container.

* * * * *